May 6, 1930. E. BAGNALL 1,757,405
VEHICLE SPRING
Filed Oct. 18, 1926

INVENTOR
E. BAGNALL
BY Munn & Co
ATTORNEYS

Patented May 6, 1930

1,757,405

UNITED STATES PATENT OFFICE

EDWIN BAGNALL, OF KENOSHA, WISCONSIN

VEHICLE SPRING

Application filed October 18, 1926. Serial No. 142,465.

My invention relates to improvements in vehicle springs, and it consists in the combinations, constructions and arrangements herein described and claimed.

An object of my invention is to provide a vehicle spring of the character described in which friction between the leaves of the spring is increased on the recoil, thereby dampening the spring action so that the recoil is much slower, thus improving the riding quality of the car, and at the same time increasing the life of the leaves.

A further object of my invention is to provide a vehicle spring construction in which a portion of the leaves are counterflexed when a sudden jar is given to the car, thereby increasing the traction of the wheels because of a less violent recoil.

A further object of my invention is to provide a vehicle spring construction which is durable in construction, compact in form, and efficient for the purpose intended.

Other objects and advantages will appear in the following specification, and the novel features of the invention will be particularly pointed out in the appended claims.

Figure 1:
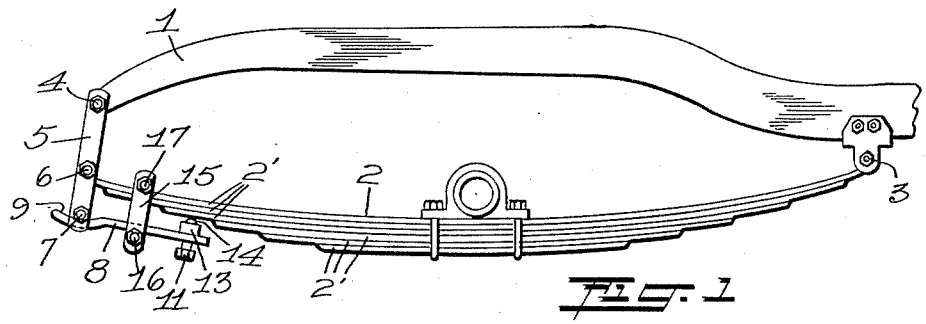
Figure 2:
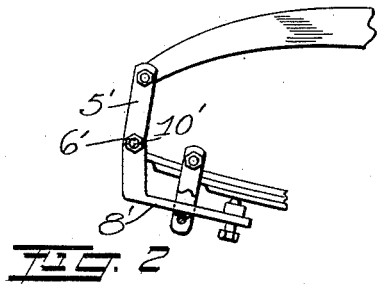
Figure 3:
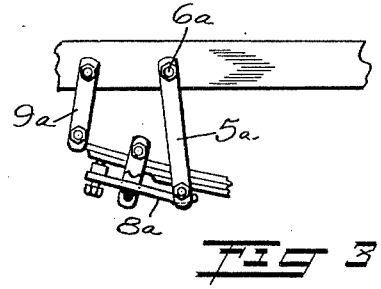
Figure 4:
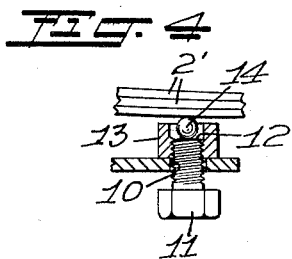
Figure 5:
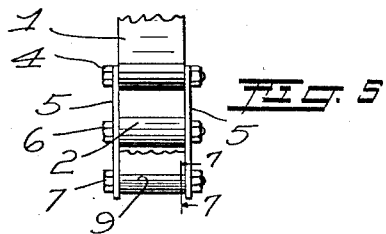
Figure 6:
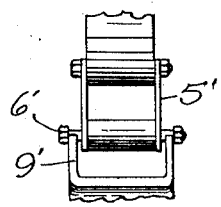
Figure 7:
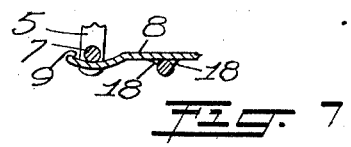

My invention is illustrated in the accompanying drawings, forming part of this application, in which Figure 1 is a side elevation of my device, Figure 2 is a modified form of the device, certain parts being broken away, Figure 3 is a view similar to Figure 2 of another modified form, Figure 4 is a sectional detail view of a ball bearing shown in Figures 1, 2 and 3, Figure 5 is a fragmentary rear view of Figure 1, Figure 6 is a fragmentary rear view of Figure 2, and Figure 7 is an enlarged sectional view taken along the line 7—7 of Figure 5.

In carrying out my invention I make use of a portion of the front and rear ends of a vehicle frame 1. In this particular instance I have shown the rear end of the frame. A semi-elliptic spring 2 comprising a series of resilient leaves 2′ is secured at one end to the frame 1 at 3 in any suitable manner.

At the extreme end of the frame 1 I have pivotally suspended at 4 a pair of supporting shackles 5. Between the shackles 5 at 6 I have pivotally mounted the opposite end of the spring 2. The lower ends of the shackles 5 are held in spaced relation by means of a bolt 7. A resilient metal strip 8 is provided which has one end curved as at 9, and adapted to slidably engage the bolt 7. The opposite end of the resilient member 8 is provided with a hole 10 through which a set screw 11 is inserted. The end 12 of the screw is threaded to receive a nut 13. As will be observed, the end 12 of the set screw is flat and terminates before reaching the upper edge of the nut 13. Within that portion of the nut not occupied by the end 12 of the set screw is disposed a ball 14. The ball projects slightly above the upper edge of the nut 13, rests upon the flat end 12 of the set screw, and is in operative engagement with the under surface of one of the leaves 2′, (see Figure 4).

The member 8 is held between the side members 15 of a spring clip. A bolt 16 passes through the members 15 and serves as a supporting fulcrum for the member 8. A companion bolt 17 is provided which bears against the upper face of the spring 2. In order to prevent the spring clip from moving longitudinally with respect to the spring I have provided lugs 18, which are preferably forged to the resilient member 8, and engage opposite sides of the bolt 16, as shown in Figure 7.

From the foregoing description of the various parts of the device, the operation thereof may be readily understood. Looking now at Figure 1, it will be seen that the curved end 9 of the resilient member 8 is in engagement with the bolt 7, and the opposite end is in engagement with the under surface of a portion of the spring 2, by means of the ball 14, which is retained by the nut 13. As the bolt 16 is disposed underneath the member 8, it will be seen that the member 8 constitutes a lever. Assuming now that the car is running along and is given a sudden jar which is sufficient to straighten the leaves 2′, an elongation of the spring 2 will result. Due to the lengthening of the spring, the lower ends of the shackles 5 will be moved outwardly, moving the bolt 7 along the curved surface 9 of member 8. It will be seen that as the shackles move outwardly the vertical distance between the bolts 4 and 7 is shortened, thereby decreasing the tension upon the curved end 9 of the member 8.

The bolt 16 constitutes a fulcrum for the resilient member 8. As the tension upon the curved portion 9 is decreased, there is a corresponding decrease in the tension between the ball 14 and the spring leaves 2'. This permits the spring 2 to straighten with a minimum of friction between the leaves 2'.

As the spring 2 begins to recoil, it is of course shortened. As the spring shortens, there is a drawing in of the shackles 5 which increases the vertical distance between the bolts 4 and 7. As this distance is increased, there is a corresponding increase in the tension upon the curved portion 9, due to the downward movement of the bolt 7. As the curved portion 9 of the member 8 is moved downwardly, the fulcrum 16 will cause the opposite end of the member 8 to move upwardly, thereby increasing the tension between the ball 14 and the leaves 2'. It will be observed that as the ball moves upwardly against the under side of the spring 2, the bolt 17 will be caused to move downwardly. This movement of the ball 14 and the bolt 17 will cause that portion of the spring which is engaged by them to counterflex. The counterflexing of the spring at this time will tend to increase the friction between the leaves on the recoil, thereby dampening the action of the spring.

The ball 14 which is free to move within the nut 13 permits a maximum of flexibility of the device with a minimum of resistance.

In Figure 2 I have shown a modified form of my device. In this form the shackles 5' terminate just below the bolt 6'. The resilient member 8' is provided with upturned portions 9', which are recessed at 10' to receive opposite ends of the bolt 6', (see Figure 6). The principle of operation is the same as in my preferred form.

In Figure 3 I have shown another modified form of my device. In this form I have provided companion shackles 5ª, which are pivotally secured to the frame of the car at 6ª. In this form the arm 8ª is reversed, which permits a shorter shackle 9ª at the end of the frame. This form is particularly adapted to be used on the front end of the frame where less space is available. The principle of operation is the same as in my other forms.

I claim:

1. The combination with a vehicle spring comprising a series of spring leaves, of a counterflexing lever, shackles disposed in parallel relation and pivotally connected to one end of said spring, means connecting one end of said shackles and adapted to slidably engage a portion of said counterflexing lever, and a spring clip constituting a fulcrum for said counterflexing lever.

2. The combination with a vehicle spring comprising a series of spring leaves, of a counterflexing lever, one end of said counterflexing lever being provided with a curved portion, and the other end being provided with an adjustable means adapted to operatively engage a portion of said spring leaves, shackles disposed in parallel relation, a bolt carried by said shackles and adapted to engage the curved portion of said counterflexing lever, and a spring clip constituting a fulcrum for said counterflexing lever, thereby permitting one end of said counterflexing lever to be moved against and away from a portion of said spring leaves.

3. The combination with a vehicle frame and a vehicle spring having one end pivotally carried by the frame, said spring comprising a series of spring leaves disposed in frictional engagement with each other, of a counterflexing lever, one end of said counterflexing lever being provided with a curved portion, and the other end being provided with an adjustable means adapted to engage the convex side of said spring, a spring clip constituting a fulcrum for said counterflexing lever and arranged to engage the concave side of said spring, shackles pivotally carried by said frame and arranged to pivotally carry the opposite end of said spring, and a bolt carried by the shackles for slidably engaging the curved portion of said counterflexing lever, whereby the spring clip and said adjustable means are moved in opposite directions so as to cause said spring to counterflex on the recoil.

4. The combination with a vehicle frame having a vehicle spring associated therewith, of a counterflexing lever, shackle means pivotally connected with one end of the vehicle spring and the vehicle frame, said shackle means being arranged to slidably engage a portion of the counterflexing lever during the bound and rebound of the vehicle spring, fulcrum means for holding the counterflexing lever in operative relation with respect to the vehicle spring, and adjustable ball bearing means carried by the counterflexing lever and arranged for engaging a portion of the vehicle spring.

EDWIN BAGNALL.